3,112,401
SHIELDING TO CONFINE MAGNETIC FIELD TO ION SOURCE AREA OF A NEUTRON GENERATOR
Adrianus Cornelis van Dorsten and Otto Reifenschweiler, both of Eindhoven, Netherlands, assignors to North American Philips Company, Inc., New York, N.Y., a corporation of Delaware
Filed Sept. 12, 1958, Ser. No. 760,789
Claims priority, application Netherlands Sept. 27, 1957
5 Claims. (Cl. 250—84.5)

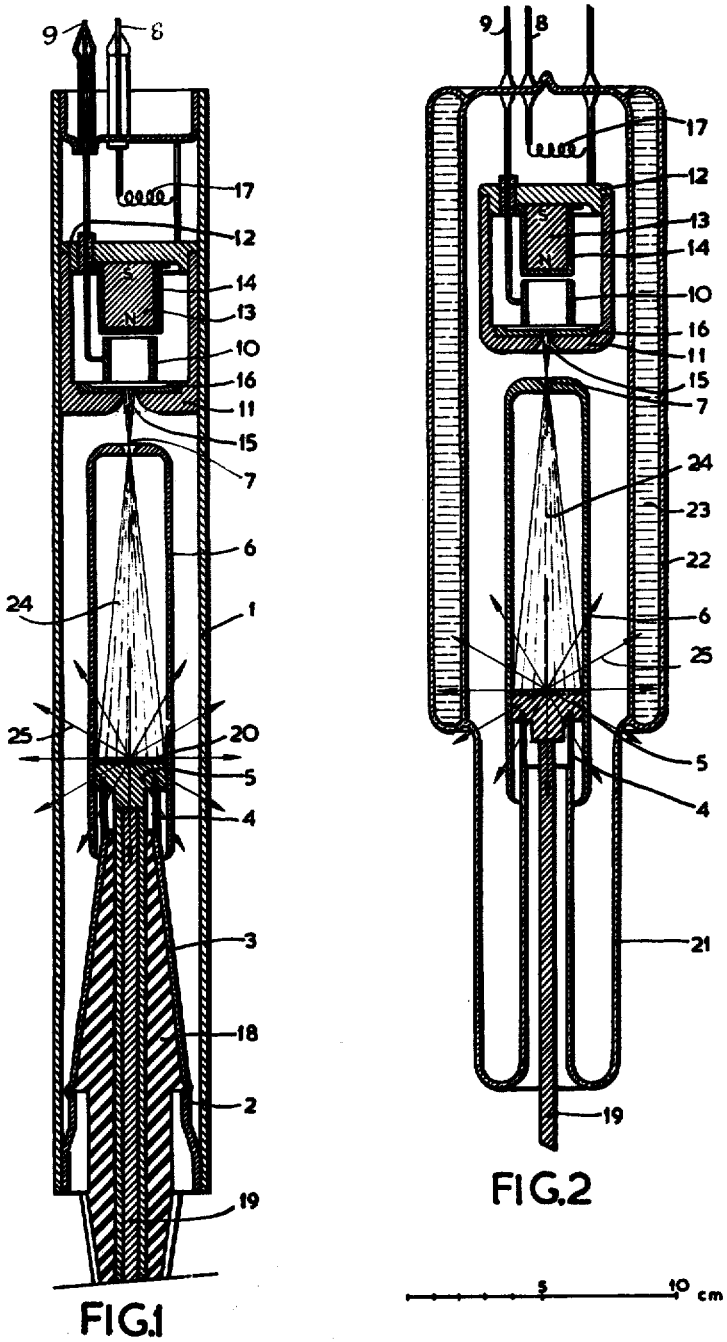

The invention relates to a neutron generator in which a target plate is bombarded by ions of a hydrogen isotope, which ions are formed in a discharge between two flat plates, which serve as a cathode, surrounded by a cylindrical anode. An axial magnetic field, is provided while one of the cathode plates has an opening for the outlet of the ions.

Such neutron generators have been described in U.S. Patent 2,211,668 issued to F. M. Penning. The magnetic field is obtained by means of a coil which surrounds the vacuum space. Between the target plate and the ion source provision is made of one or more acceleration electrodes.

Neutron generators are used, for example for scientific research work, in which a complicated construction with a plurality of electrode leads for high voltages are not objectionable, although they render the system costly. Neutron generators are also frequently used for testing bore holes, where the requirement of a simple construction is imperative, especially in deep bore holes where the temperature is very high.

The invention has for its object to provide a neutron generator of simple construction, which needs only one high-voltage supply lead.

In accordance with the invention a neutron generator is provided with a target plate which is bombarded with ions of a hydrogen isotope. These ions are formed in a discharge which takes place between two flat plates, one of which is provided with an aperture for the ions produced, serving as a cathode. The discharge is surrounded by a cylindrical anode. An axial magnetic field is provided which is, in accordance with the invention, completely screened from the acceleration space, i.e., the space between the target electrode and the apertured plate. The target in the bottom of a hollow acceleration electrode having an aperture directed towards the aperture in one of the flat plates constituting the cathode. No further electrodes are provided between the cathode and the target.

With the construction according to the invention there is no magnetic field in the acceleration space, so that higher acceleration voltages are permissible, since the reduction of the break-down voltage by the apparent increase in pressure due to the presence of a magnetic field does not occur in this case. Since the target plate is arranged in the bottom of the acceleration electrode, secondary electrons can not return into the acceleration space, which also permits a higher break-down voltage. Owing to the shape of the acceleration electrode such a spread of the ion beam occurs that the target plate is bombarded uniformly and burning does not occur.

The invention will be explained with reference to the accompanying drawing, which shows a neutron generator according to the invention, in FIG. 1 with a metal housing and in FIG. 2 with a glass housing.

Referring to FIG. 1, reference numeral 1 designates a sheath of chromium-nickel steel. With the aid of a fernico-hood 2 a glass cone 3 is sealed herein, which, in turn, is secured by sealing to a fernico annulus 4. The annulus 4 supports a copper block 5. To the copper block 5 is secured an elongated sleeve 6 of chromium-nickel steel. The rounded-off top side of the sleeve 6 has a small aperture 7. On the other side of the sheath 1 current supply wires 8 and 9 are introduced with the aid of fernico sleeves and glass caps. The wire 9 leads to a cylindrical anode 10 of aluminum. In the sheath 1 provision is made of a sleeve 11, having a bottom 12, both made of soft iron, and both together serving as a magnetic shield surrounding the discharge space. On the bottom 12 a permanent magnetic block 13 covered by an aluminum layer 14 is provided. The bottom of sleeve 11 is provided with an aperture 15 and coated with an aluminum layer 16. Aluminum layers 14 and 16 form together the cathode for the glow discharge to anode 10. Under the influence of the magnetic field which has the effect of increasing the gas pressure as described in U.S. Patent 2,211,668, copious ions of the deuterium gas are formed by electrons emitted by the cathode. Deuterium ions leaving the discharge space through aperture 15 are accelerated towards the target 20 in the electrode 6. The supply wire 8 leads to a zirconium wire 17, which is wound helically and the other end of which is conductively connected via a stay wire to the wall.

Inside the glass cone 3 provision is made of a mass 18 of silicon rubber, through which the high-voltage supply wire 19 is passed. On the copper block 5 is provided the target plate 20 of silver, which is coated with a layer of titanium of a few microns in thickness. The whole vacuum space is filled with the hydrogen isotope deuterium under a pressure of 1 to $1000 \times 10^{-5}$ mm. Hg. Deuterium is also absorbed in the zirconium helix and if necessary the pressure may be controlled by heating this helix. The field in the ion source is about 500 gauss and the voltage for the discharge is about 2000 v.

The titanium layer on the target plate 20 on the bottom of the acceleration electrode 6 is saturated with the hydrogen isotope tritium. The acceleration voltage between the ion source and the acceleration electrode may be 100 to 200 kv.

In the ion source deuterium ions are formed, which reach the target plate 20, subsequent to acceleration, where they react with the tritium provided, while they form neutrons with an energy of about 14 Mev. The ion paths are indicated by lines. The neutrons which are emitted in all directions are indicated by arrows 25.

In FIG. 2 the parts corresponding to those of FIG. 1 are designated by the same reference numerals. The wall consists in this case of the glass cylinder 21, which has an outer wall at the level of the acceleration space. The intermediate space is filled with insulating oil 23 or a similar liquid.

In the two figures the dimensions are evident from the measure of 10 cms. drawn at their side.

What is claimed is:

1. A neutron generator comprising an envelope, a gaseous filling within said envelope, means within a portion of said envelope for producing a glow-discharge comprising a cathode having a first plate-shaped portion and a second plate-shaped portion provided with an aperture and arranged parallel to said first portion, a cylindrical anode centrally disposed between said cathode portions, and magnetic means within said envelope for producing a magnetic field which extends substantially perpendicular to said cathode portions, a target within a second portion of said envelope and disposed to be struck by ions produced by said glow-discharge, means to accelerate the ions produced in the discharge toward the target to effect a nuclear reaction, and magnetic shielding means surrounding said glow-discharge producing means and said magnetic field producing means except for an aperture for the passage of ions produced by the glow-discharge.

2. A neutron generator comprising an envelope, a gaseous filling within said envelope, means within a portion of said envelope for producing a glow-discharge comprising a cathode having a first plate-shaped portion and a second plate-shaped portion provided with an aperture and arranged parallel to said first portion, a cylindrical anode centrally disposed between said cathode portions, and magnetic means within said envelope for producing a magnetic field which extends substantially perpendicular to said cathode portions, a target within a second portion of said envelope and disposed to be struck by ions produced by said glow-discharge, a cylindrical accelerating electrode surrounding said target and having an aperture for the passage of ions produced by the glow-discharge, and magnetic shielding means surrounding said glow-discharge producing means and said magnetic field producing means except for an aperture for the passage of ions produced by the glow-discharge.

3. A neutron generator comprising an envelope, a gaseous filling within said envelope, means within a portion of said envelope for producing a glow-discharge comprising a cathode having a first plate-shaped portion and a second plate-shaped portion provided with an aperture and arranged parallel to said first portion, a cylindrical anode centrally disposed between said cathode portions, and a permanent magnet within said envelope for producing a magnetic field which extends substantially perpendicular to said cathode portions, a target within a second portion of said envelope and disposed to be struck by ions produced by said glow-discharge, a cylindrical accelerating electrode surrounding said target and having an aperture for the passage of ions produced by said glow-discharge, and magnetic shielding means surrounding said glow-discharge producing means and said magnetic field producing means except for an aperture for the passage of ions produced by the glow-discharge.

4. A neutron generator comprising an envelope, a gaseous filling within said envelope, means with a portion of said envelope for producing a glow-discharge comprising a cathode having a first plate-shaped portion and a second plate-shaped portion provided with an aperture and arranged parallel to said first portion, a cylindrical anode disposed between said cathode portions, and means within said envelope for producing a magnetic field which extends substantially perpendicular to said cathode portions, a target within a second portion of said envelope and disposed to be struck by ions produced by said glow-discharge, a cylindrical accelerating electrode surrounding said target and having an aperture for the passage of ions produced by the glow-discharge, a second envelope surrounding at least that portion of the first envelope containing the accelerating electrode and spaced therefrom, an insulating medium filling the space between the first and second envelopes, and magnetic shielding means surrounding said glow-discharge producing means and said magnetic field producing means except for an aperture for the passage of ions produced by the glow-discharge.

5. A neutron generator comprising an envelope, a gaseous deuterium filling within said envelope, means within a portion of said envelope for producing a glow-discharge comprising a cathode having a plate-shaped portion, a second cathode having a plate-shaped portion provided with an aperture and arranged parallel to said first portion, a cylindrical anode centrally disposed between said cathode portions, and magnetic means within said envelope for producing a magnetic field which extends substantially perpendicular to said cathode portions, a tritium-containing target within a second portion of said envelope and disposed to be struck by ions produced by said glow-discharge, means to accelerate the ions produced in the discharge toward the target to effect a nuclear reaction, and magnetic shielding means and said magnetic field producing means surrounding said glow-discharge producing means except for the passage of ions produced by the glow-discharge.

References Cited in the file of this patent
UNITED STATES PATENTS

| | | |
|---|---|---|
| 2,211,668 | Penning | Aug. 13, 1940 |
| 2,240,914 | Shutze | May 6, 1941 |
| 2,424,788 | Bachman | July 29, 1947 |
| 2,636,990 | Gow et al. | Apr. 28, 1953 |
| 2,689,918 | Youmans | Sept. 21, 1954 |
| 2,769,096 | Frey | Oct. 30, 1956 |

UNITED STATES PATENT OFFICE
CERTIFICATE OF CORRECTION

Patent No. 3,112,401 November 26, 1963

Adrianus Cornelis van Dorsten et al.

It is hereby certified that error appears in the above numbered patent requiring correction and that the said Letters Patent should read as corrected below.

Column 4, lines 29 and 30, strike out "and said magnetic field producing means" and insert the same after "means" in line 31, same column 4.

Signed and sealed this 19th day of May 1964.

(SEAL)
Attest:
ERNEST W. SWIDER

Attesting Officer

EDWARD J. BRENNER
Commissioner of Patents